United States Patent [19]

Shiraga et al.

[11] Patent Number: 5,378,275
[45] Date of Patent: Jan. 3, 1995

[54] MICA-CONTAINING PIGMENT COMPOSITION AND A WATER BASE PAINT COMPOSITION CONTAINING A MICA-CONTAINING PIGMENT(S), AS WELL AS A METHOD OF MANUFACTURING THE SAME

[75] Inventors: Ryuichi Shiraga, Neyagawa; Teruaki Kuwajima, Higashiosaka, both of Japan

[73] Assignee: Nippon Paint Co., Ltd., Osaka, Japan

[21] Appl. No.: 151,816

[22] Filed: Nov. 15, 1993

[30] Foreign Application Priority Data

Nov. 24, 1992 [JP] Japan ................................. 4-353460

[51] Int. Cl.$^6$ ............................................. C04B 14/20
[52] U.S. Cl. ..................... 106/417; 106/487; 106/491; 106/506
[58] Field of Search ............... 106/417, 487, 491, 506

[56] References Cited

U.S. PATENT DOCUMENTS 4,552,593 11/1985 Ostertag ............................ 106/417
4,976,787 12/1990 Ito et al. ............................. 106/441
5,246,492 9/1993 Arima et al. ....................... 106/403

FOREIGN PATENT DOCUMENTS 4317019 12/1993 Germany .
58-109566 6/1983 Japan .
1110540 4/1989 Japan .
1287149 11/1989 Japan .

*Primary Examiner*—Mark L. Bell
*Assistant Examiner*—Scott L. Hertzog
*Attorney, Agent, or Firm*—Townsend & Banta

[57] ABSTRACT

A water base paint composition containing a mica-containing pigment(s), said composition comprising a water base paint containing a water soluble or water dispersion film-forming polymer selected from among acrylic resin, polyester resin, alkyd resin and polyurethane resin, a cross-linking agent and optional additives such as pigments, thickeners, fillers, etc., wherein a mica-containing pigment(s) comprised of mica flakes or metal-oxide-coated mica flakes with a surface acid content of 0–10 micromol/g, a surface base content of 0–30 micromol/g and a heat of water wetting of 0–1.5 J/g, the surface of which pigment being uniformly coated with melamine resin which has at least one triazine ring per molecule, is uniformly dispersed in said water base paint. The water base paint composition containing a mica-containing pigment(s) of this invention has superior storage stability as well as superior film appearance and film performance, and thus it is a water base paint composition particularly suited for the metallic coating of automobiles and such.

6 Claims, No Drawings

MICA-CONTAINING PIGMENT COMPOSITION AND A WATER BASE PAINT COMPOSITION CONTAINING A MICA-CONTAINING PIGMENT(S), AS WELL AS A METHOD OF MANUFACTURING THE SAME

FIELD OF THE INVENTION

This invention relates to a mica-containing pigment composition and a water base paint composition containing a mica-containing pigment(s), as well as a method of manufacturing same.

BACKGROUND OF THE INVENTION

It has been proposed to blend a mica-containing pigment in a so-called metallic paint composition to be used in the glossy finish on steel products and other metal products (especially automobile bodies).

For this type of coating, the automobile industry employs the 2-coat-1-bake method. This method comprises coating with a metallic paint composition, and then, without baking, coating with a clear paint, and finally baking.

Recently, a water base coating material with a metal-like gloss which contains mica foil coated with titanium dioxide (Japanese unexamined patent publication (Tokkai) Sho-109566) has been proposed and is receiving attention. However, when a mica-containing pigment is blended in a water base paint, the dispersion of three pigment is poor and aggregation and such occurs. Therefore, if this is used in a metallic coating followed by application of a clear paint, the appearance is poor, and thus it cannot be used in automobile coatings.

Also, it has been found that the water resistance of the resulting paint film is poor when metallic coating is conducted using this type of water base paint.

Therefore, a water base paint is desired which: is a water base paint composition containing a mica-containing pigment(s); has good dispersion stability; can be used for the metallic coating of automobiles and such; gives a superior appearance; and does not cause deterioration of coating characteristics, particularly the water resistance and adhesion. The object of this invention is to provide a mica-containing pigment composition for such water base paints and a water base paint composition containing the mica-containing pigment, as well as a method for manufacturing same.

SUMMARY OF THE INVENTION

The object of the present invention described above is achieved by using a mica-containing pigment(s) comprised of mica flakes or metal-oxide-coated mica flakes with a surface acid content of 0–10 micromol/g, a surface base content of 0–30 micromol/g and a heat of water wetting of 0–1.5 J/g, the surface of which pigment being uniformly coated with melamine resin which has at least one triazinc ring per molecule.

That is, by using a water base paint composition containing a mica-containing pigment(s), said composition comprising a water base paint containing a water soluble or water dispersion film-forming polymer selected from among acrylic resin, polyester resin, alkyd resin and polyurethane resin, a cross-linking agent and optional additives such as pigments, thickeners, fillers, etc., wherein a mica-containing pigment(s) comprised of mica flakes or metal-oxide-coated mica flakes with a surface acid content of 0–10 micromol/g, a surface base content of 0–30 micromol/g and a heat of water wetting of 0–1.5 J/g, the surface of which pigment being uniformly coated with melamine resin which has at least one triazine ring per molecule, is uniformly dispersed in said water base paint.

Also, the water base paint composition containing a mica-containing pigment(s) of this invention is satisfactorily manufactured by a method characterized by: preparing a uniform mixture of a mica-containing pigment(s) comprised of mica flakes or metal-oxide-coated mica flakes with a surface acid content of 0–10 micromol/g, a surface base content of 0–30 micromol/g and a heat of water wetting of 0–1.5 J/g, melamine resin which has at least one triazine ring per molecule, and optionally added organic solvent; and dispersing and mixing the obtained mica-containing pigment composition in a water base paint containing a water soluble or water dispersion film-forming polymer selected from among acrylic resin, polyester resin, alkyd resin and polyurethane resin, a cross-linking agent and optional additives such as pigments, thickeners, fillers, etc.

DETAILED DESCRIPTION OF THE INVENTION

The inventors conducted a study on a technique of preparing a water base paint composition containing a mica-containing pigment(s) by blending and dispersing a mica-containing pigment(s) into a water base paint composition containing a water soluble or water dispersion film-forming polymer selected from among acrylic resin, polyester resin, alkyd resin and polyurethane resin, and a cross-linking agent such as melamine resin, block polyisocyanate, epoxy resin as essential ingredients, as well as optional additives such as pigments, thickeners, fillers, etc., and the inventors discovered that a paint film with satisfactory dispersibility and without any deterioration of the paint film appearance and water resistance can be obtained by a simple method in which mica with specific surface characteristics are selected for use and said mica-containing pigment surface is coated with a compound which has at least one triazinc ring per molecule, such as melamine resin, and that this method does not require any kind of chemical treatment beforehand to improve the dispersibility of the mica-containing pigment, and thus completed this invention.

That is, the primary essential element of this invention is the finding to the effect that the objective of this invention is achieved only when mica flakes or metal-oxide-coated mica flakes with a surface acid content of 0–10 micromol/g, a surface base content of 0–30 micromol/g and a heat of water wetting of 0–1.5 J/g, based on the testing methods described below, are selected for use.

The mica-containing pigment used in this invention may be mica flakes such as muscovite, biotite and synthetic mica, or metal-oxide-coated mica flakes which are prepared by coating them with single or multiple layers of metal oxide such as $TiO_2$, $ZrO$, $Fe_2O_3$, $Ce_2O_3$ and $ZrO_2$. Furthermore, if desired, they can be treated with chromic acid or coated with a coupling agent(s).

However, as mentioned above, these mica flakes must have a certain surface acid content, surface base content and heat of water wetting. These characteristics are measured and defined as described below.

1. Measurement of the pigment surface acid content (Coloring Material, vol. 61, No. 12, p 692–698, 1988)

2 g of the pigment and 30 ml of a methylisobutylketone solution of triethylamine is put into a conical flask and the flask is tightly capped, and then ultrasonic dispersion is conducted for 1 hour in an ultrasonic cleaner (Bransonic 321 manufactured by Branson) with the reservoir temperature adjusted at 20° C. 10 ml of the supernatant, obtained by removing the pigment by centrifugation, is titrated with a methlisobutylketone solution of $10^{-2}$N perchloric acid to determine the amount of triethylamine consumed by acids on the pigment surface, and thus the amount of the acid per unit weight of the pigment is determined.

2. Measurement of the pigment surface base content (Coloring Material, vol. 61, No. 12, p 692–698, 1988)

2 g of the pigment and 30 ml of a methylisobutylketone solution of $10^{-2}$N acetic acid is put into a conical flask and the flask is tightly capped, and then ultrasonic dispersion is conducted for 1 hour in an ultrasonic cleaner with the reservoir temperature adjusted at 20° C. 10 ml of the supernatant obtained by removing the pigment by centrifugation, is diluted with 100 ml of a 4:1 mixture of methylisobutylketone and methanol, is titrated (back-titrated) with a solution of potassium methoxide (prepared by diluting a $10^{-1}$N potassium methoxide benzene methanol solution for nonaqueous titration, manufactured by Wako Jun-yaku, with a 4:1 mixture of methylisobutylketone and methanol) to determine the amount of acetic acid consumed by bases on the pigment surface, and thus the amount of tile bases per unit weight of the pigment is determined.

3. Measurement of the heat of water wetting (Coloring Material, vol. 62, No. 9, p 524–528, 1989)

A quantity of the pigment, the surface area of which should be about 10~15 m², is put into a glass ampul, and the ampul is melt-sealed after deaeration down to $10^{-4}$ Torr at room temperature. Approximately 100 ml of water and the ampul are put into a Dewar bottle and, after verifying that the entire bottle is at a constant temperature (30° C.), the ampul is destroyed to put the pigment and the water into contact. The amount of heat generated is measured by using a twin type thermostatic wall calorimeter (TK-221, manufactured t,y Tokyo Riko). The surface area of the pigment is measured by the BET method by using an Autosorb 1, manufactured by Quantachrome.

It has been verified that the mica-containing pigment(s) used in this invention has to have the surface acid content, as measured with the test method described above, in the range of 0–10 micromol/g, and that the dispersibility becomes poor when it is over 10 micromol/g.

The surface base content of the mica-containing pigment(s) has to be in the range of 0–30 micromol/g, and, if it is over 30 micromol/g, then the hardenability of the water base paint decreases and the water resistance of the paint film becomes poor.

Furthermore, the heat of water wetting of the mica-containing pigment(s) has to be in the range of 0–1.5 J/g. This is because it has been verified that if it is below 0 J/g, then the dispersibility becomes poor, and that if it is over 1.5 J/g, then the water resistance of the paint film becomes poor.

Most commercial mica-containing pigments vary greatly in their surface characteristics, for example, with the base content range of 0–80 micromol/g, the acid content range of 0–30 micromol/g and the heat of water wetting range of 0–5. 0 J/g. Wc have found out that, even in combination with the coating treatment of the mica-containing pigment surface at a later stage, the objective of this invention to improve the paint film appearance and the water resistance cannot be achieved unless the surface characteristics are within tile specific range as described earlier.

Also, in this invention, the mica-containing pigment described above has to be dispersed and contained in the water base paint after the surface is uniformly coated with a compound which has at least one triazine ring per molecule, the representative example of which compound would be melamine resin.

The inventors conducted various investigations looking for countermeasures, including surface treatments of the pigment, to solve the problem of pigment aggregation when a mica-containing pigment is dispersed in a water base paint, and we were surprised to discover that the objective of the invention can be easily achieved by simply using melamine resin to uniformly coat the mica-containing pigment with specific surface characteristics.

For the melamine resin used in the surface coating of the mica-containing pigment with specific surface characteristics, alkoxy methylol melamines are generally used. Concrete examples are methoxy methylol melamine, n-butoxy methylol melamine, isobutoxy methylol melamine, methoxy butoxy methylol melamine, etc. Their condensation products can be used as well. More preferable is n-butoxy methylol melamine with a degree of condensation of 1–3, but any prior art melamine resin may be used as long as it is melamine resin with at least one triazine ring.

In order to uniformly coat the surface of the mica-containing pigment with melamine resin, it is sufficient to mix the mica-containing pigment and the melamine resin and agitate the mixture. More preferable is to dissolve the melamine resin in an organic solvent, then add the mica-containing pigment and agitate the mixture.

Another preferable method comprises: dispersing mica-containing pigment in a relatively large quantity of organic solvent to obtain a slurry solution, adding melamine resin and uniformly mixing them, and then removing a part or all of said organic solvent by, for example, a heated-vacuum procedure to obtain the mica-containing pigment composition.

For this, any organic solvent which is allowed to be present in a water base paint can be used. There is no limitation, but concrete examples would be: aromatic compounds such as toluene and xylene; alcohols such as ethanol, isopropyl alcohol and butyl alcohol; ketones such as acetone, methylisobutyl ketone and methylethyl ketone; esters such as ethyl acetate and ethyl butyrate; petroleum compounds such as petroleum naphtha and mineral spirits; and cellosolve, carbitol, etc.

These organic solvents are not essential, but it is preferable to use them in order to uniformly coat the surface of the mica-containing pigment when the viscosity of the melamine resin is high, or the amount used is small.

The amount of tile organic solvent is not critical, but it should be used within the range where its presence is allowed in a water base paint. For example, 0–200 parts can be preferably used for a total of 100 parts of the mica-containing pigment and melamine resin (solid). The content in the mica-containing pigment composition should preferably be 50 wt % or less, so as to keep to a minimum the amount of organic solvent transferred into the water base paint.

For the weight ratio of the mica-containing pigment and melamine resin (solid), it is necessary to have 1 part or more of the latter for 100 parts of the former, and the practical range is 1–100 parts. If the amount of melamine resin is less than this, then, when used for coating of the pigment surface, the objective of this invention cannot satisfactorily be achieved in terms of dispersibility (appearance), water resistance and adhesion. If it is over 100 parts, then compatibility and such are not very desirable in a system which uses a hardening agent other than melamine resin as a paint hardening agent. It is of course possible to use more than 100 parts of melamine resin in a system which uses melamine resin as a hardening agent.

Therefore, the water base paint composition containing a mica-containing pigment(s) of this invention is satisfactorily manufactured by a method characterized by: preparing a uniform mixture of a mica-containing pigment(s) comprised of mica flakes or metal-oxide-coated mica flakes with a surface acid content of 0–10 micromol/g, a surface base content of 0–30 micromol/g and a heat of water wetting of 0–1.5 J/g, melamine resin which has at least one triazine ring per molecule, and optionally added organic solvent; and dispersing and mixing the obtained mica-containing pigment composition in a water base paint containing a water soluble or water dispersion film-forming polymer selected from among acrylic resin, polyester resin, alkyd resin and polyurethane resin, a cross-linking agent and optional additives such as pigments, thickeners, fillers, etc.

Another method of manufacturing it is to uniformly mix the mica-containing pigment, melamine resin, optionally added organic solvent and volatile solvent, then volatilize the volatile solvent from the mixture to obtain the mica-containing pigment composition, which is then uniformly dispersed and mixed in a water base paint.

The amount of the mica in the water base paint is equivalent to the content in a solvent type metallic paint, and there is no need to make special changes. Usually, 3–100 weight parts of the mica-containing pigment is added to 100 parts of the film forming polymer solids.

The water base paint to which the, mica-containing pigment composition is added in this invention is a typical hardening type water base paint which has a film forming polymer and a hardening agent as essentials. Examples of the film forming polymer are water base acrylic polymers and vinyl polymers, which are addition polymers, and water base polyesters, alkyds and polyurethane resins, which are condensation polymers.

More preferably used are water base acrylic polymer and water base urethane polymers, as described in Japanese unexamined patent publication (Tokkai) Hei 3-47875 and Hei 4-25582.

A hardening agent(s) is blended in the water base paint of this invention. Examples of such a hardening agent are: melamine resin such as alkoxy methylol melamines including methoxy methylol melamine, butoxy methylol melamine and methoxybutoxy melamine; block (poly) isocyanate; and epoxy resin.

For the water base paint composition used in this invention, inorganic color pigments (for example, white pigments such as titanium oxide, and red-yellow pigments such as iron oxide), extender pigments (such as clay and talk) and organic pigments (such as Cinquasia red, cyanine blue and carbon black) which are generally used in this field are used in a dispersed paste form.

Also, scaly pigments comprised of metal or metal oxide, such as aluminum pigment paste, can be used as required. Additives such as thickeners and surface adjustment agents can also be blended in.

For the water base paint composition of this invention, 200–10,000 weight parts of the film forming polymer and 50–5,000 weight parts of the hardening agent for 100 weight parts of the mica-containing pigment composition as described above usually represent preferable ratios for use. For other ingredients, appropriate amounts are used. However, these blending proportions are not specifically limited in this invention, but rattler they are appropriately selected based on the purpose of use and the effects, as well as the materials used.

The water base paint composition of this invention is prepared by, for example, uniformly agitating and mixing the ingredients described above. The order of addition and the conditions for addition are not specifically limited and a conventional paint preparation method is employed.

The water base paint composition containing a mica-containing pigment(s) associated with this invention is applied on a work to be coated by a conventional coating methods, such as atomization coating, dip coating or electrocoating, to have a conventional film thickness. After the hardening process, a conventional clear coating, for example, is applied to obtain a metallic coating with a very good appearance and excellent water resistance, thus providing an industrially very useful paint(s).

In this invention, the affinity in a water base binder can be improved by using melamine resin which has at least one triazine ring per molecule to coat a mica-containing pigment(s) comprised of mica flakes or metal-oxide-coated mica flakes which has specific pigment surface characteristics, and thus a water base paint composition with good dispersibility is obtained. This composition can give a paint film with a good appearance, water resistance and adhesion.

EXAMPLES

This invention is described by referring to preparation examples, embodiment examples and comparative examples, as follows:

Preparation of the film forming polymer:

Preparation—Example 1

76 weight parts of ethylene glycol monobutyl ether was put into a reaction container which is equipped with an agitator, a temperature controller and a cooling tube(s). Then, 61 weight parts of a monomer solution comprising 15 weight parts of 63 weight parts of methylmethacrylate, 48 weight parts of 2-hydroxydiethyl methacrylate, 117 weight parts of n-butyl acrylate, 27 weight parts of methacrylic acid, 30 weight parts of acrylamide and 3 weight parts of azobisisobutyronitrile was added and the temperature was adjusted to 120° C. while agitation. 245 weight parts of the monomer solution was added in 3 hours, and then agitation was continued for another hour. Furthermore, 28 parts of dimethylethanol amine and 200 weight parts of deionized water were added to obtain acrylic resin varnish with a volatile ingredient content of 50% and a number average molecular weight of the resin of 12,000. This resin characteristically had an OH value of 70 and an acid value of 58.

Preparation—Example 2

Synthesis of oligomers containing hydrophilic groups:

40.2 weight parts of dimethylol propionic acid, 30 weight parts of triethylamine and 402 weight parts of N-methyl pyrolidone were put into an apparatus similar to that described in Preparation Example 1, then heated to 90° C. and dissolved. 290 weight parts of isophorone diisocyanate, 400 weight parts of polycarbonatediol (Placsel CD-211PL, manufactured by Daicel Chemical Industries, Ltd. ) (molecular weight: 1000), and 600 weight parts of polypropylene glycol (molecular weight: 2000) were added, and, after a 10-minute agitation, 1.3 weight parts of dibutyl in dilaurate was added. The temperature was then raised to 95° C. and the reaction was conducted for 1 hour.

Preparation of the water dispersion system:

2293 weight parts of deionized water and 11.5 weight parts of hydrazinc hydrate are put into an apparatus similar to that described in Preparation Example 1, and then, while agitated, the urethane pre-polymer solution described above was added. 30 minutes of agitation was then conducted. The composition thus obtained was a cloudy stable water dispersion system. The acid value of its solid portion was 16.0, and the non-volatile content was 33%.

Preparation of the clear paint:

Preparation—Example 3

The following ingredients were weighed and put into a stainless steel container, and the mixture was agitated with a laboratory agitator to obtain the clear paint.

| | |
|---|---|
| Varnish (1) | 100 parts |
| Unban 20 SE-60 | 36 parts |
| Modaflow (from Monsanto) | 0.5 parts |
| Resin particles (2) | 2.2 parts |

(1) Preparation of the varnish used in Preparation Example 3:

70 parts of xylene and 20 parts of n-butanol were put into a container equipped with an agitator, a temperature controller and a reflux condenser, and 20 parts of a solution with the following composition was added to it:

| | |
|---|---|
| Methacrylic acid | 1.2 parts |
| Styrene | 26.4 parts |
| Methyl methacrylate | 26.4 parts |
| n-butyl acrylate | 36.0 parts |
| 2-hydroxy ethyl acrylate | 10.0 parts |
| Azobisisobutyronitrile | 1.0 parts |

The mixture was then heated while agitated to raise the temperature. With the reflux condenser in operation, the remaining 81.0 parts of the mixed solution described above was dripped in over the course of 2 hours. Then, a solution comprised of 0.3 parts of azobisisobutyronitrile and 10 parts of xylene was dripped in over the course of 30 minutes. The reaction solution was agitated and refluxed for another 2 hours to complete the reaction, and acrylic resin varnish with a non-volatile content of 50% and the number average molecular weight of 8,000 was obtained. The OH value was 48.

(2) Preparation of the resin particles used in Preparation Example 3:

282 parts of deionized water, 10 parts of polyester resin (3) and 0.75 parts of dimethylethanolamine were put into a 1-liter container equipped with an agitator, a cooler and a temperature controller, and the ingredients were dissolved while agitated with the temperature maintained at 80° C. Added to this was a solution prepared by dissolving 45 parts of azobiscyano valerianic acid into 45 parts of water and 4.3 parts of dimethylethanolamine. Then, a mixed solution comprised of 70.7 parts of methyl methacrylate, 94.2 parts of n-butyl acrylate, 70.7 parts of styrene, 30 parts of 2-hydroxyethyl acrylate and 4.5 parts of ethyleneglycol dimethyl acrylate was dripped in over the course of 60 minutes. After the dripping, a solution prepared by dissolving 1.5 parts of azobiscyano valerianic acid into 15 parts of deionized water and 1.4 parts of dimethylethanol amine was added, and the agitation was continued for 60 minutes at 80° C. to obtain an emulsion with a non-volatile content of 45%, viscosity of 92 cps (25° C.) and a particle size of 0.156 micrometers. This emulsion was spray-dried to remove water, and re-dispersed in xylene with 100 parts of the resin particles for 200 parts of xylene to prepare a xylene dispersion liquid of the resin particles. The particle size was 0.8 micrometers.

(3) Preparation of the polyester resin used for the resin particles 184 parts of bishydroxyethyltaurinc, 180 parts of neopentylglycol, 236 parts of azelaic acid, 186 parts of phthalic anhydride and 27 parts of xylene were put into a 2-liter reaction vessel equipped with an agitator, a nitrogen introduction tube, a temperature controller, a condenser and a decanter, and the temperature was raised. The water generated by the reaction was removed by means of azeotropy with xylene.

The temperature was gradually adjusted to 190° C. over the course of about 2 hours from the beginning of the refluxing, and the agitation and dehydration were continued until the acid number became 145, as equivalent carbonic acid, and then the temperature was lowered to 140° C. Then, while the temperature was maintained at 140° C., 314 parts of "Carjura E10" (glycidyl ester of versatic acid, from Shell) was dripped in over the course of 30 minutes, followed by continued agitation for 2 hours to complete the reaction. The polyester resin obtained had an acid value of 59, a hydroxyl value of 90 and Mn of 1054.

Preparation—Example 4

The following materials for the composition were weighed and put into a stainless steel container, and the mixture was agitated with a laboratory agitator to obtain a clear paint.

| | |
|---|---|
| Varnish (4) | 100 parts |
| Desmodule N-75 | 16.7 parts |

(4) Preparation of the varnish used for Preparation Example 4:

57 parts of xylene and 6 parts of n-butanol were put into an apparatus similar to the one used in Preparation Example 3, and 20 parts of a solution with the following composition was added to it:

| | |
|---|---|
| Styrene | 30.0 parts |
| Ethylhexyl methacrylate | 45.2 parts |
| Ethylhexyl acrylate | 5.5 parts |
| 2-hydroxyethyl methacrylate | 16.2 parts |

| Methacrylic acid | 3.1 parts |
| Azobisisobutyronitrile | 4.0 parts |

The mixture was then heated while agitated to raise the temperature. With the reflux condenser in operation, the remaining 84.0 parts of the mixed solution described above was dripped in over the course of 2 hours. Then, a solution comprised of 0.5 parts of azobisisobutyronitrile, 23 parts of xylene and 14 parts of n-butanol was dripped in over the course of 20 minutes. The reaction solution was agitated and refluxed for another 2 hours to complete the reaction, and acrylic resin varnish with a non-volatile content of 50% and a number average molecular weight of 3,400 was obtained. The OH value was 70.

Embodiment—Example 1

The surface characteristics of commercial white mica-containing pigments coated with titanium dioxide were measured according to the methods described in the specifications, and the pigment with the following characteristic values was selected and used: a surface acid content of 2 micromol/g, a surface base content of 17 micromol/g, and a heat of water wetting of 0.85 J/g. 100 weight parts of this pigment, 300 weight parts of isopropanol, 10 weight parts of Cymel 303 (hexamethoxymethylol melamine, from Mitsui Cyamide Co. Ltd.) and 20 weight parts of butyldiglycol were uniformly mixed, and the 300 weight parts of isopropanol were removed under decompression and at a raised temperature to obtain a white mica-containing pigment composition.

Embodiment—Example 2

100 weight parts of a red mica-containing pigment with a surface acid content of 4 micromol/g, a surface base content of 13 micromol/g, and a heat of water wetting of 0.84 J/g, 30 weight parts of Cymel 303 (hexamethoxymethylol melamine, from Mitsui Cyamide Co. Ltd. ) and 20 weight parts of butyldiglycol were uniformly mixed and agitated with a mixer to obtain a red mica-containing pigment composition.

Embodiment—Example 3

100 weight parts of a green mica-containing pigment with a surface acid content of 5 micromol/g, a surface base content of 24 micromol/g, and a heat of water wetting of 1.0 J/g, 50 weight parts of U-ban 128 (butylated melamine, from Mitsui Toatsu) and 20 weight parts of butyldiglycol were uniformly mixed and agitated with a mixer to obtain a green mica-containing pigment composition.

Embodiment—Example 4

100 weight parts of a blue mica-containing pigment with a surface acid content of 2 micromol/g, a surface base content of 17 micromol/g, and a heat of water wetting of 0.58 J/g, and 5 weight parts of U-ban] 128 (butylated melamine, from Mitsui Toatsu) were uniformly mixed and agitated with a mixer to obtain a blue mica-containing pigment composition.

Comparative Example 1

100 weight parts of a red mica-containing pigment with a surface acid content of 7 micromol/g, a surface base content of 40 micromol/g, and a heat of water wetting of 1.50 J/g, 10 weight parts of Cymel 303 (hexamethoxymethylol melamine, from Mitsui Cyamide Co. Ltd. ) and 20 weight parts of butyldiglycol were uniformly mixed and agitated with a mixer to obtain a red mica-containing pigment composition.

Comparative Example 2

100 weight parts of a blue mica-containing pigment with a surface acid content of 13 micromol/g, a surface base content of 43 micromol/g, and a heat of water wetting of 2.50 J/g, 10 weight parts of U-ban 128 (butylated melamine, from Mitsui Toatsu) and 20 weight parts of butyldiglycol were uniformly mixed and agitated with a mixer to obtain a blue mica-containing pigment composition.

Comparative Example 3

100 parts of the identical red mica-containing pigment used in Embodiment Example 2 and 20 weight parts of butyldiglycol were uniformly mixed to obtain a red mica-containing pigment composition for comparison.

Embodiment Example 5

15 parts of the mica-containing pigment composition obtained in Embodiment Example 1 was dispersed and mixed into 112 parts of the film forming polymer obtained in Preparation Example 1. Next, 43 weight parts of the urethane emulsion obtained in Preparation Example 3 was dispersed, and then, as a hardening agent, 30 weight parts of Cymel 303 was added and uniformly mixed to obtain a water base metallic paint.

Embodiment Examples 6–8

The same method as in Embodiment Example 5 was employed on the mica-containing pigment compositions from Embodiment Examples 2, 3 and 4 to obtain corresponding water base metallic paints.

Embodiment Example 9

The same method as in Embodiment Example 5 was employed, except for the fact that 30 weight parts of methylethylketoneoxime block phorondiisocyanate was used instead of the hardening agent Cymel 303, to obtain a water base paint.

Comparative Examples 4–6

The same method as in Embodiment Example 5 was employed on the mica-containing pigment compositions from Comparative Examples 1,2 and 3 to obtain the corresponding water base metallic paints for comparison.

Evaluation of the Paint Film

Preparation of the coating test plate(s):

Steel plates with an intermediate coating were coated with the water base paint compositions of Embodiment Examples 5–9 and Comparative Examples 4–6 in two stages at one minute intervals to have a dry film thickness of 20 micrometers by means of the air spray coating method with an environmental temperature of 23° C. and relative humidity of 85%, and then 2 minutes of pre-heating was conducted at 80° C. Then, the clear paint(s) prepared in Preparation Examples 3–4 was applied in one stage to have a dry film thickness of 30 micrometers, and a 7-minute setting was done. Next, the paint plates were baked in a dryer for 30 minutes at 130° C. to prepare No. 1–10 test plates, and the appearance and water resistance were evaluated. The results are shown in Table 1.

Here, "steel plates with an intermediate coating" were prepared by applying an automobile electrodeposition paint and an automobile intermediate paint in their respective coating lines, followed by baking, on polished soft steel plates which had been through a degreasing and chemical conversion treatment.

[TABLE 1]

| Test plate | 1 | 2 | 3 | 4 | 5 | 6 |
|---|---|---|---|---|---|---|
| Water base paint | Example 5 | Example 6 | Example 7 | Example 8 | Example 9 | Example 5 |
| Clear | Preparation Example 3 | Preparation Example 3 | Preparation Example 3 | Preparation Example 3 | Preparation Example 3 | Preparation Example 4 |
| Appearance | ○ | ○ | ○ | ○ | ○ | ○ |
| Water resistance | ○ | ○ | ○ | ○ | ○ | ○ |

| Test plate | 7 | 8 | 9 | 10 |
|---|---|---|---|---|
| Water base paint | Example 6 | Comparative Example 4 | Comparative Example 5 | Comparative Example 6 |
| Clear | Preparation Example 4 | Preparation Example 3 | Preparation Example 3 | Preparation Example 3 |
| Appearance | ○ | X | X | X |
| Water resistance | ○ | X | X | X |

Appearance: Visual evaluation
○ Good
X Mica bumps on the surface observed
Water resistance: Abnormal appearance after a 10-day soaking test at 40° C.
○ No abnormality observed
X Blisters observed in the paint film

What is claimed is:

1. A water base paint composition having a mica-containing pigment(s) comprising a water base paint having a water soluble or water dispersion film-forming polymer selected from among acrylic resin, polyester resin, alkyd resin and polyurethane resin, a cross-linking agent and optional additives including pigments, thickeners, or fillers, wherein a mica-containing pigment(s) comprised of mica flakes or metal-oxide-coated mica flakes with a surface acid content of 0–10 micromol/g, a surface base content of 0–30 micromol/g and a heat of water wetting of 0–1.5 J/g, the surface of which pigment is uniformly coated with a melamine resin which has at least one triazine ring per molecule, is uniformly dispersed in said water base paint.

2. A method of manufacturing a water base paint composition containing a mica-containing pigment(s) characterized by: preparing a uniform mixture of a mica-containing pigment(s) comprised of mica flakes or metal-oxide-coated mica flakes with a surface acid content of 0–10 micromol/g, a surface base content of 0–30 micromol/g and a heat of water wetting of 0–1.5 J/g, melamine resin which has at least one triazine ring per molecule, and optionally added organic solvent; and dispersing and mixing the obtained mica-containing pigment composition in a water base paint containing a water soluble or water dispersion film-forming polymer selected from among acrylic resin, polyester resin, alkyd resin and polyurethane resin, a cross-linking agent and optional additives such as pigments, thickeners, or fillers.

3. A method as described in claim 2 wherein the mica-containing pigment composition is prepared by mixing a mica-containing pigment(s), melamine resin and an optionally added organic solvent(s) with the weight ratio of the mica-containing pigment and the melamine resin (solid ingredients) of 100:1–500.

4. A method as described in claim 2 wherein the mica-containing pigment composition is prepared by mixing a mica-containing pigment(s), melamine resin, an optionally added organic solvent(s) and a volatile solvent(s) with the weight ratio of the mica-containing pigment and the melamine resin (solid ingredients) of 100:1–500, and then volatilizing the volatile solvent from the mixture.

5. A method as described in claim 2 wherein, in the case where the cross-linking agent is melamine resin, the mica-containing pigment composition is made of the mica-containing pigment and melamine resin with the weight ratio of 100:1 or greater, and optionally an added organic solvent.

6. A mica-containing pigment(s) comprised of mica flakes or metal-oxide-coated mica flakes with a surface acid content of 0–10 micromol/g, a surface base content of 0–30 micromol/g and a heat of water wetting of 0–1.5 J/g, the surface of which pigment is uniformly coated with melamine resin which has at least one triazine ring per molecule.

* * * * *